United States Patent [19]

Raidel

[11] Patent Number: 5,002,305
[45] Date of Patent: Mar. 26, 1991

[54] VEHICLE SUSPENSION SYSTEM WITH STANDARDIZED TORQUE BEAM AND SPECIAL MONOPIVOT BUSHING ASSEMBLY

[76] Inventor: John E. Raidel, Rte. 1, Box 400-M, Springfield, Mo. 65804

[21] Appl. No.: 10,632

[22] Filed: Feb. 4, 1987

[51] Int. Cl.$^5$ .............................................. B60G 11/26
[52] U.S. Cl. .................................... 280/711; 280/683; 280/713
[58] Field of Search ............... 280/683, 688, 702, 711, 280/713, 724, 725; 267/63 R

[56] References Cited

U.S. PATENT DOCUMENTS

| | | | |
|---|---|---|---|
| 3,154,321 | 10/1964 | McLean | 280/713 |
| 3,482,854 | 12/1969 | Masser | 280/713 |
| 4,166,640 | 9/1979 | Van Denberg | 280/711 |
| 4,256,326 | 3/1981 | Contrell et al. | 280/683 |
| 4,379,572 | 4/1983 | Hedenberg | 280/713 |

Primary Examiner—Kenneth R. Rice
Attorney, Agent, or Firm—Rogers, Howell & Haferkamp

[57] ABSTRACT

A suspension system having a torque beam with a bushing for connecting the torque beams to a hanger. The torque beam can be telescopingly received in a sleeve of an axle seat assembly. There are a number of different axle seat assemblies for accommodating various vehicles but all have the sleeve so that one form of torque beam can be used with any one of the axle seat assemblies. The bushing has strategically located recesses to facilitate flow of the bushing member and to make it more yieldable in a vertical direction than in a longitudinal direction. An annular groove in the outer wall of the bushing also improves flow under compression of the bushing member. The telescoping connection between the torque beam and an axle seat assembly may include knock-away components to facilitate breaking the components apart in the event they become rusted together.

18 Claims, 6 Drawing Sheets

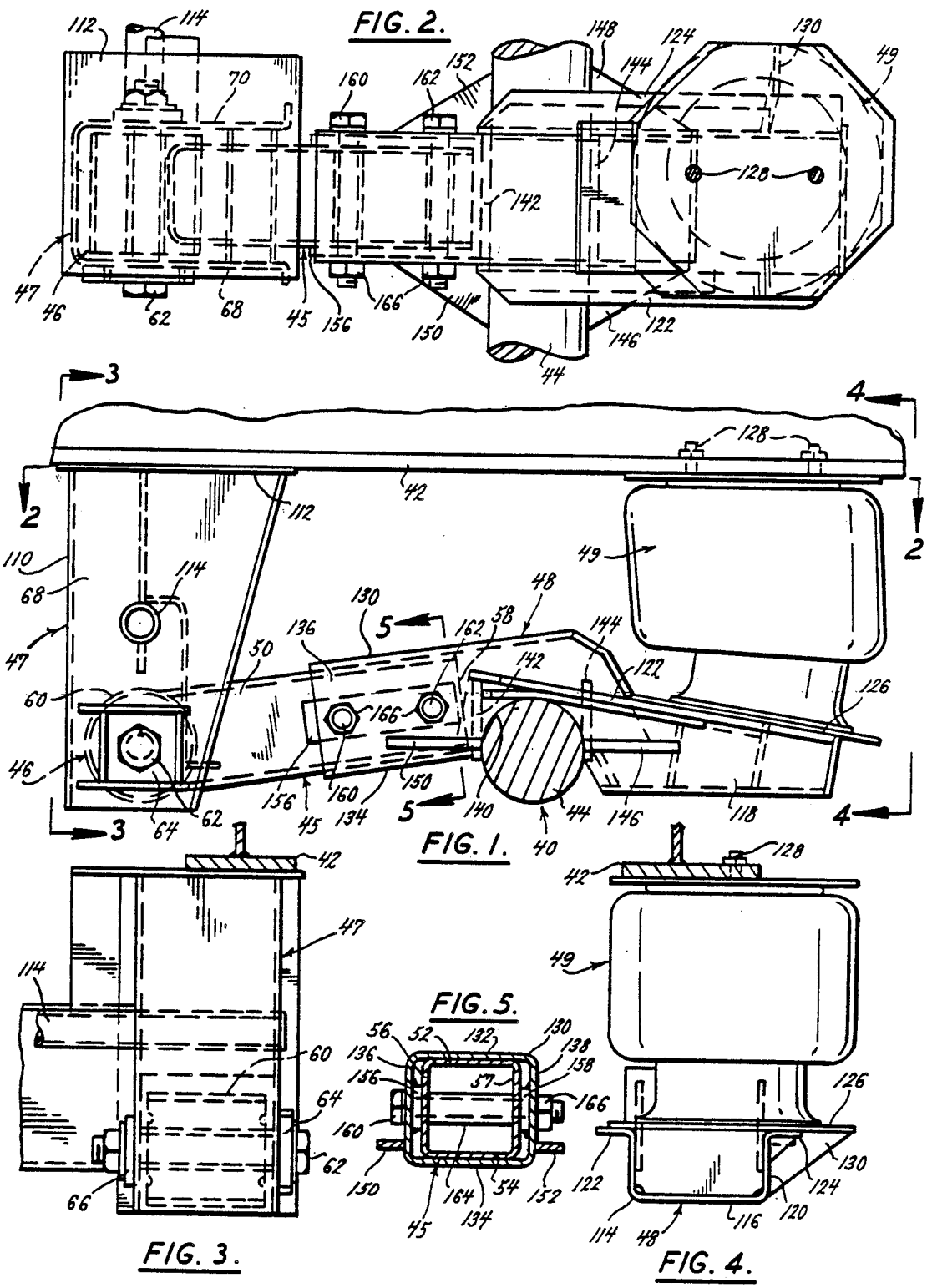

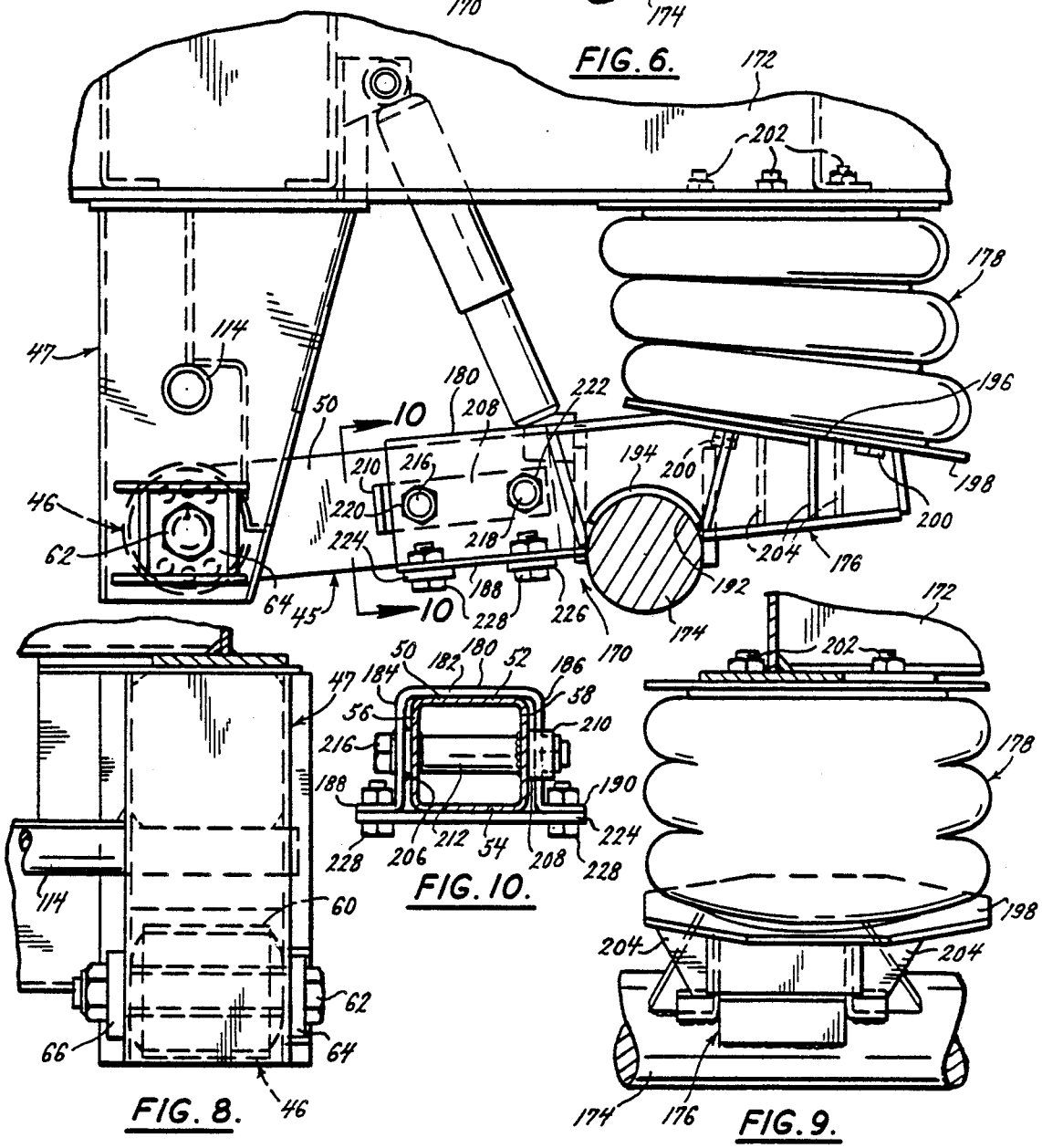

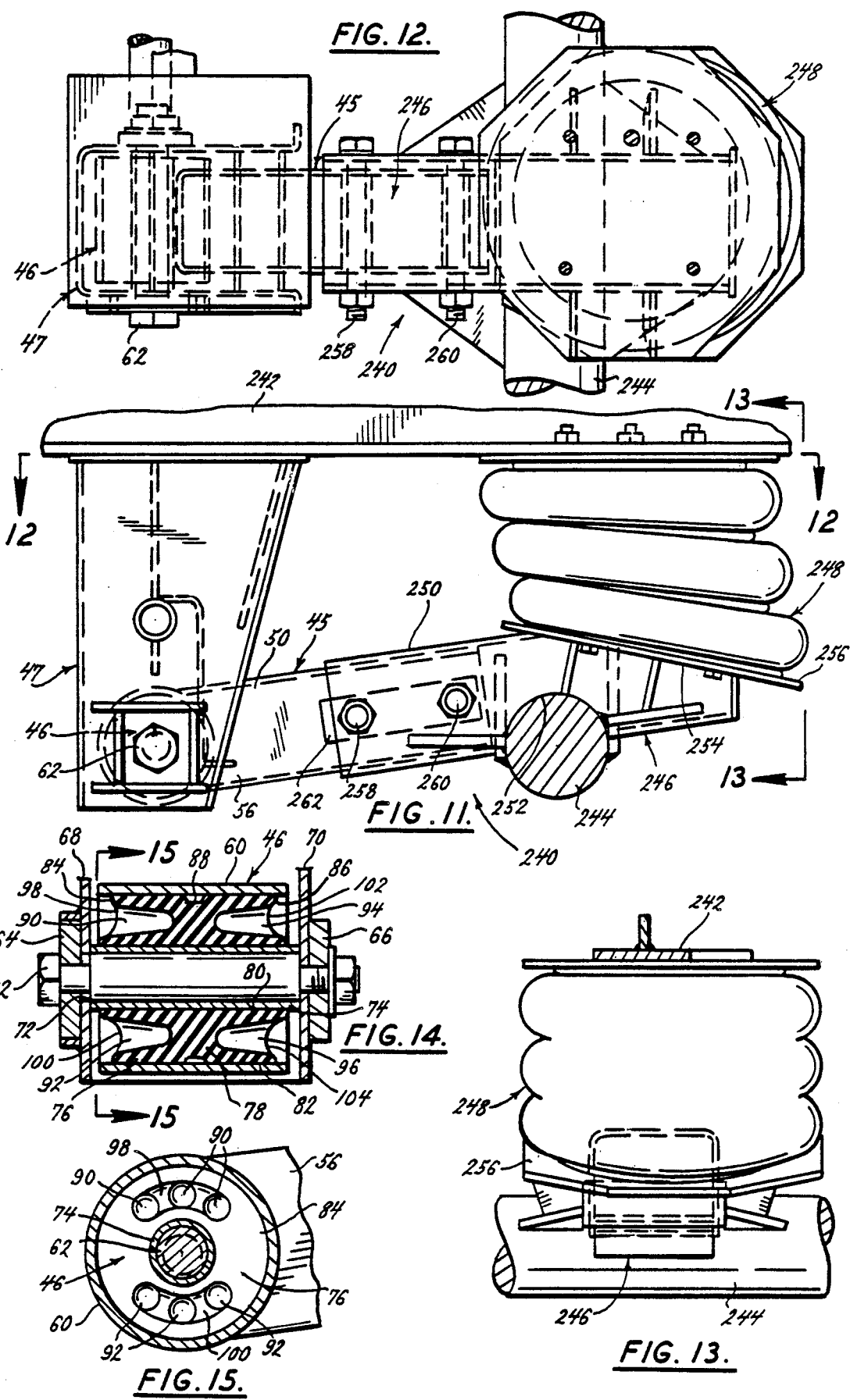

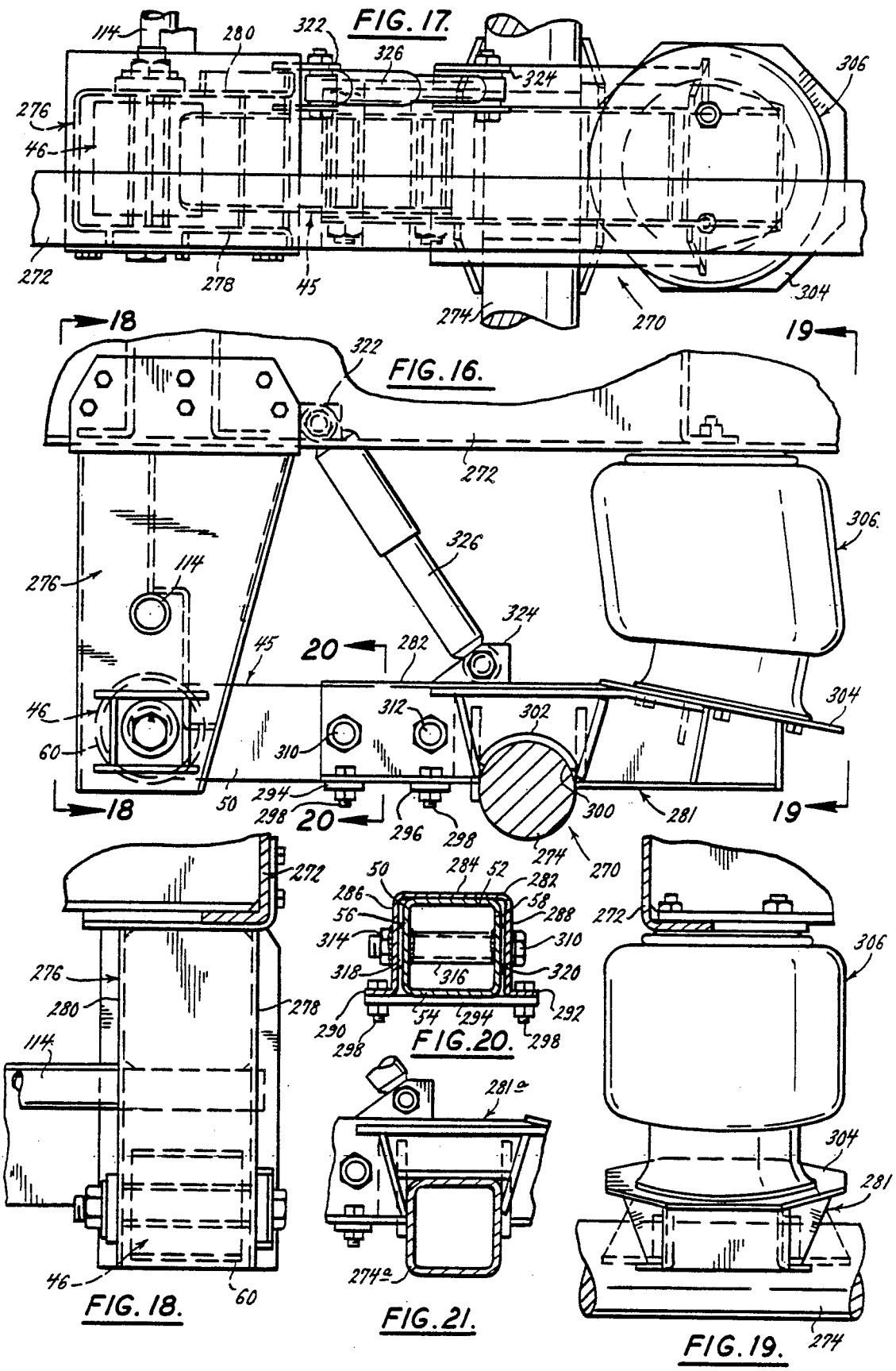

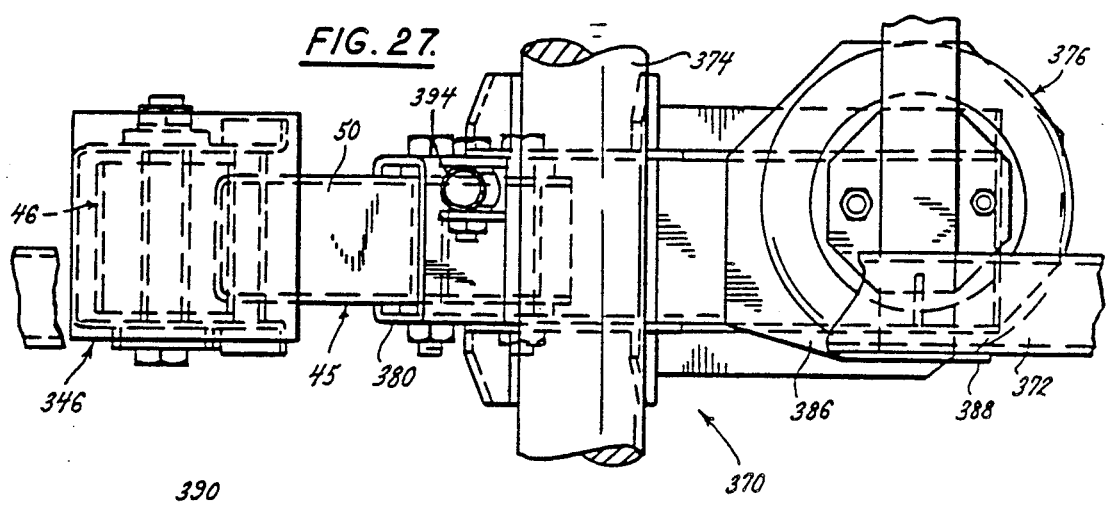
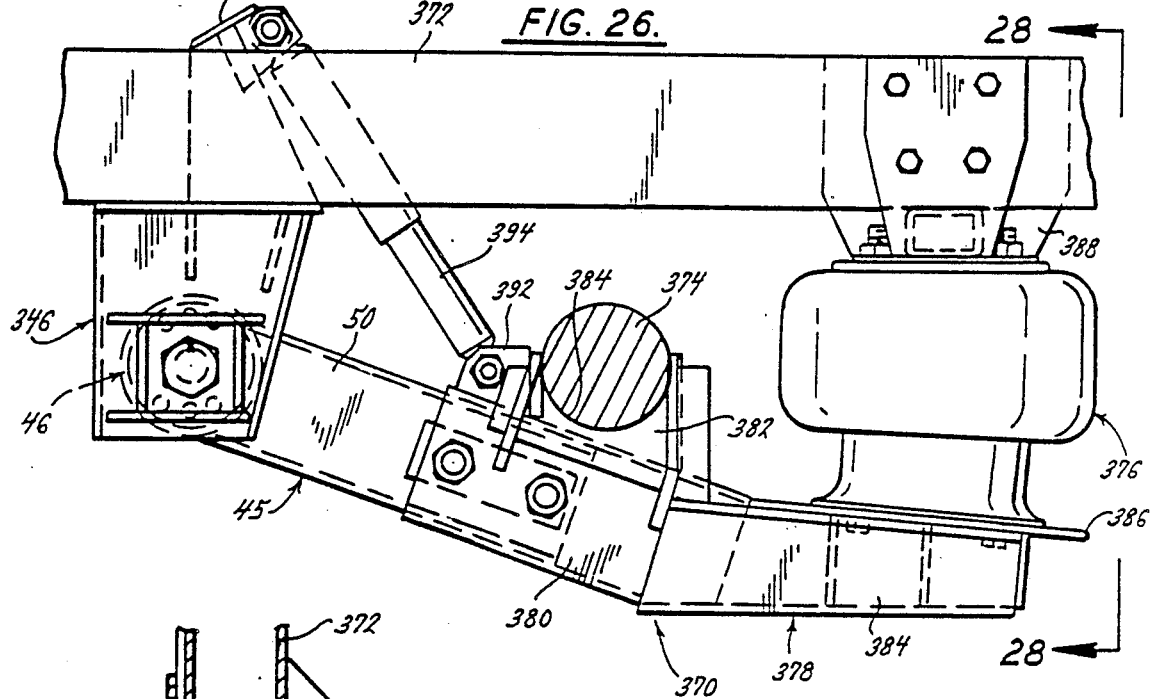
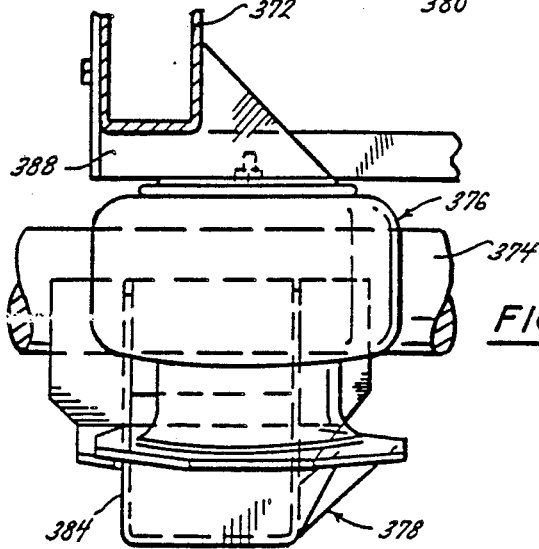

VEHICLE SUSPENSION SYSTEM WITH STANDARDIZED TORQUE BEAM AND SPECIAL MONOPIVOT BUSHING ASSEMBLY

BACKGROUND AND SUMMARY OF THE INVENTION

This invention relates to a suspension system that incorporates a torque beam that can be connected to a variety of axle seat assemblies and to the form of a bushing for mounting the torque beam to a hanger. The invention further relates to means to break the torque beam free of the axle seat assembly even though rusted in place.

There are several embodiments to the invention. These embodiments differ primarily in the different structure of the axle seat assembly. Some axle seat assemblies are overslung and some are underslung. All are designed to accommodate various installation parameters dictated by the kind of vehicle with which the suspension system is to be installed and the kind of air spring that is to be used. Also important is the location of the axle relative to the chassis and relative to the hanger.

Each of the suspension systems of this invention includes a hanger, a torque beam, a bushing assembly for mounting an end of the torque beam to the hanger, an axle seat assembly connected to the vehicle axle, an air spring mounted between the axle seat assembly and the chassis, and means for connecting the torque beam to the axle seat assembly. Each axle seat assembly may be distinct in structure, but it has means defining a sleeve. The torque beam has means defining a tubular member that is complementary to the sleeve. The tubular member is fitted telescopically within the sleeve and connected rigidly in place. The connecting means includes bolts and spacer plates between the sides of the tubular member and the inner sides of the sleeve.

In an embodiment of the invention, one of these spacer plates can be knocked free in the event of rust so that the parts can be more readily separated. Also, the means defining the sleeve of the axle seat assembly may include straps across the lower side of the torque beam that are removable to further facilitate separation of the components.

The bushing assembly includes an inner sleeve, an outer sleeve, and an annular elastomeric member between the inner and outer sleeves. The outer sleeve is formed at an end of the torque rod. The elastomeric member has special recesses in it to facilitate flow of the elastomeric member under compression.

DESCRIPTION OF THE DRAWINGS

FIG. 1 is a side elevation view of a suspension system according to one embodiment of this invention;

FIG. 2 is a top plan view of the suspension system of FIG. 1 as viewed along the plane of the line 2—2 of FIG. 1;

FIG. 3 is a front elevation view of the suspension system of FIG. 1 as viewed along the plane of the line 3—3 of FIG. 1;

FIG. 4 is a rear elevation view of the suspension system of FIG. 1 as viewed along the plane of the line 4—4 of FIG. 1;

FIG. 5 is a view in section taken along the plane of the line 5—5 of FIG. 1;

FIG. 6 is a side elevation view of a second embodiment of the suspension system of this invention;

FIG. 7 is a top plan view of the suspension system of FIG. 6;

FIG. 8 is a front elevation view of the suspension system of FIG. 6 as viewed from the left side of FIG. 6;

FIG. 9 is a rear elevation view of the suspension system of FIG. 6 as viewed from the right side of FIG. 6;

FIG. 10 is a view in section taken along the plane of the line 10—10 of FIG. 6;

FIG. 11 is a side elevation view of a third embodiment of the suspension system of this invention;

FIG. 12 is a top plan view taken along the plane of the line 12—12 of FIG. 11;

FIG. 13 is a rear elevation view of the suspension system of FIG. 11 as viewed along the plane of the line 13—13 of FIG. 11;

FIG. 14 is an enlarged view in vertical medial section through a preferred bushing assembly used in any of the embodiments of this invention to mount a torque rod to a hanger;

FIG. 15 is a view in section taken along the plane of the line 15—15 of FIG. 14;

FIG. 16 is a side elevation view of a fourth embodiment of the suspension system of this invention;

FIG. 17 is a top plan view of the suspension system of FIG. 16;

FIG. 18 is a front elevation view of the suspension system of FIG. 16 as viewed along the plane of the line 18—18 of FIG. 16;

FIG. 19 is a rear elevation view of the suspension system of FIG. 16 as viewed along the plane of the line 19—19 of FIG. 16;

FIG. 20 is a view in section taken along the plane of the line 20—20 of FIG. 16;

FIG. 21 is a partial side elevation view of the suspension system of FIG. 16 but showing a modification for installation on a square axle;

FIG. 26 is a side elevation view of a sixth embodiment of the suspension system of this invention;

FIG. 27 is a top plan view of the suspension system of FIG. 26; and

FIG. 28 is a rear elevation view of the suspension system of FIG. 26 as viewed along the plane of the line 28—28 of FIG. 26.

DESCRIPTION OF PREFERRED EMBODIMENT

Figure 23:
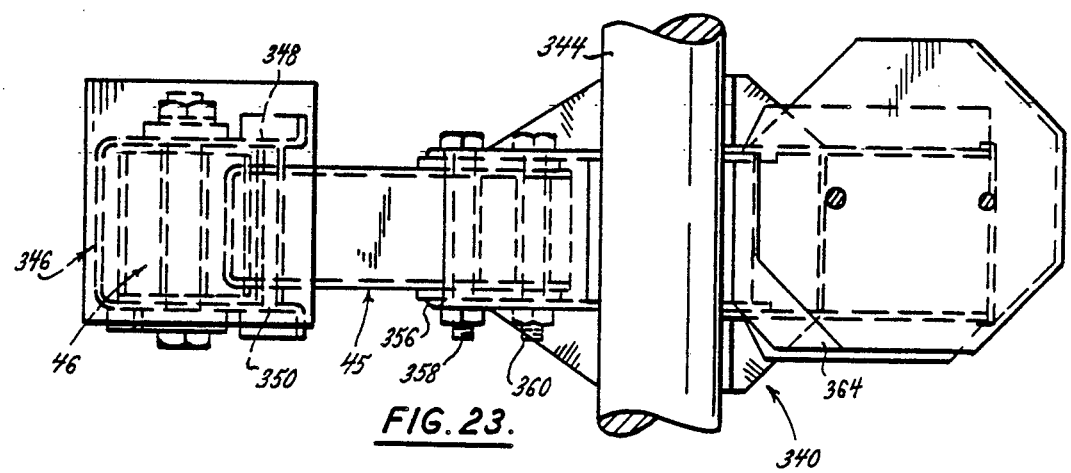
FIG. 23 is a top plan view taken along the plane of the line 23—23 of FIG. 22.

The suspension system 40 shown in FIG. 1 is installed on a vehicle having a chassis 42 and an axle 44 spaced a relatively large distance below the chassis 42. The suspension system 40 includes a torque beam 45 connected by a bushing assembly 46 to a hanger assembly 47. The torque beam 45 is connected to an axle seat assembly 48 that is welded to the axle 44. An air spring 49 is mounted between the chassis 42 and the axle seat assembly 48.

In greater detail, the torque beam 45 comprises a hollow tubular member 50 of square cross section formed by a top 52, a bottom 54 and sides 56 and 57, and preferably, the cross section of the tubular member 50 is five inches wide and five inches high. One end 58 of the tubular member 50 is squared off. The other end is welded to a transverse cylindrical sleeve 60 that functions as the outer housing for the bushing assembly 46.

The torque beam 45 is universal in that it can be used with a number of different axle seat assemblies. The axle seat assembly 48 of FIG. 1 is an example. This axle seat assembly 48 is designed to accommodate the various influencing parameters of the vehicle, such as axle height, ground clearance, location of vehicle components, size of the air spring 54, desired location of the air spring 54, and whether the axle seat assembly is to be overslung or underslung, among others.

The universality of the torque beam 45 is also such that its connection to the axle seat assembly is by fixed connections, as will be described, making the torque beam a rigid part of the axle seat assembly.

The torque beam is large (five inches square). This allows the use of lighter-gauge material, and the wall thickness of the torque beam is only ¼ inch. Yet the overall area of the torque beam is greater so that its section modulus is greater.

The bushing assembly 46 is illustrated in FIGS. 14 and 15. It should be understood that the bushing assembly 46 may incorporate an eccentric bolt 62, such as the kind disclosed in U.S. Pat. No. 3,510,149 issued to John E. Raidel, for the purpose of axle alignment. Such a bolt 62 is tightened against blocks 64 and 66 on the opposite sides of a pair of spaced plates 68 and 70 that are part of the hanger assembly 47. A hole 72 through the plate 68 is large enough to allow removal of the eccentric bolt 62.

A sleeve 74 is mounted on the eccentric bolt 62 and is locked in place upon tightening of the bolt 62 to press the blocks 64 and 66 against the plates 68 and 70. Between the inner sleeve 74 and the outer sleeve 60, there is an elastomeric bushing member 76 having an annular resilient wall 78 with an inner cylindrical face 80 in contact with the inner sleeve 74 and an outer cylindrical face 82 in contact with the outer sleeve 60. The ends 84 and 86 of the annular wall 78 are beveled, reducing the width of the annular wall 78 from the inner face 80 to about 5¼ inches to the outer face 82 to allow for flow of the annular wall 78 under compression. The uncompressed outside diameter of the bushing member 76 is about 5¼ inches before it is compressed into a sleeve 60 having an inside diameter of about five inches.

In its non-deformed condition, the annular wall 78 has an annular groove 88 midway between its ends 84 and 86 that is about ¼ inch deep and tapers inwardly from a width of about ¾ inch. The annular groove 88 allows for the flow of rubber when the bushing member 76 is compressed, at which time the annular groove 88 will be reduced in size or may disappear due to such rubber flow.

In addition, the resilient bushing member 78 has a group of three upper recesses 90 and a group of three lower recesses 92 extending from the end 84 and another group of three upper recesses 94 together with the group of three lower recesses 96 extending from the opposite end 86.

As shown in FIG. 15, the three upper recesses 90 are generally equally spaced and on a common radius, occupying generally the upper quadrant of the bushing member 76. The lower three recesses 92 are similarly oriented but lie generally within the lower quadrant of the bushing member 76. On the opposite end 86, the upper recesses 94 are aligned with the recesses 90 and the lower recesses 96 are aligned with the recesses 92. Each recess 90, 92, 94 and 96 is tapered from a radius of about 7/16 inch at its mouth to a radius of about 5/16 inch at the closed end of the recess.

There is an arcuate groove 98 extending between the three upper recesses 90. Another arcuate groove 100 extends between the lower recesses 92. A similar arcuate groove 102 extends between the recesses 94, and an arcuate groove 104 extends between the recesses 96. These arcuate grooves 98, 100, 102 and 104 allow the edges of the recesses 90, 92, 94 and 96 to move without cracking. The depth of the grooves 98, 100, 102 and 104 is about ⅛ inch.

Although FIG. 14 shows the bushing assembly 46 installed in the sleeve 60, the figure shows the resilient annular wall 78 in its uncompressed condition for illustrative purposes. It will be understood that in actual use, the outer sleeve 60 will have compressed the resilient annular wall 78 and distorted it from the condition that is illustrated in FIGS. 14 and 15. In the compressed condition, the resilient material comprising the annular wall 78 will flow with the annular groove 88 being reduced in size or disappearing and the recesses 90, 92, 94 and 96 being distorted.

Because the recesses 90, 92, 94 and 96 are in the upper and lower quadrants of the resilient member 98, the bushing assembly 46 is more flexible in a vertical direction. Longitudinal movement is more firmly resisted.

Because the axle 44 is relatively low relative to the chassis 42 in the particular vehicle shown in FIG. 1, the hanger 47 is relatively long to locate the bushing assembly 46 at approximately the same elevation as the axle 44. The hanger 47 includes the spaced plates 68 and 70 which are part of a vertical U-channel 110. The U-channel 110 is welded to a horizontal plate 112 that is welded to or otherwise connected to the chassis 42. A reinforcing pipe 114 extends between the side plates 68 and 70 and also extends across the vehicle to a similar hanger like the hanger 47 on the opposite side of the vehicle.

The axle seat assembly 48 includes a U-channel 114 having a bottom 116 and sides 118 and 120 (see FIG. 4) and having side flanges 122 and 124 to which a plate 126 is welded. The plate 126 functions as a lower spring seat for the air spring 54, and the upper side of the air spring is connected to the chassis 42 such as by bolts 128. Gusset plates 130 welded to the channel member 114 and the horizontal plate 126 provide reinforcement.

The plate 126 is inclined downwardly and rearwardly as is shown in FIG. 1. It covers the section of the flanges 122 and 124 lying rearward of the axle 44. A rectangular sleeve 130 having a top wall 132, a bottom wall 134 and side walls 136 and 138 fits between the side walls 118 and 120 of the channel member 120. The width of the sleeve 130 between the sides 136 and 138 is about the same as the span between the sides 118 and 120, enabling the sleeve 130 to be fit within and welded in place to the channel member 120.

The sides 136 and 138 have cutouts 140 that receive the axle 44 and allow the axle seat assembly 52 to be welded to the axle 44. There are reinforcing cross members 142 and 144 between the side plates 136 and 138, and these cross member 142 and 144 are also welded to the axle 44. In addition, gusset plates 146 and 148 are welded to the side walls 120 and 122 and to the axle 44.

Additional gussets 150 and 152 are welded to the sides 136 and 138 of the sleeve 130 and to the axle 44.

When it is installed, the torque beam 45 fits within the sleeve 130. As shown in FIG. 5, the top and bottom walls 52 and 54 of the torque beam 45 bear against the top and bottom walls 132 and 134 of the sleeve 130 whereas the side walls 56 and 57 of the torque beam 45 are spaced from the side walls 136 and 138 of the sleeve. Within the resulting space, there are spacer plates 156 and 158, and in this embodiment, they are welded to the side walls 136 and 138, respectively. These spacer plates 156 and 158 act as bearing surfaces for the sides of the torque beam 45.

The torque beam 45 is locked within the sleeve 130 by a pair of bolts 160 and 162. The bolts 160 and 162 pass through spacer sleeves 164 before the bolts are tightened by nuts 166. Because the parts are close fitting, tightening of the nuts 166 causes the spacer plates 156 and 158 to be pressed against the sides 56 and 57 of the torque beam 45, in turn pressing those torque beam sides against the spacer sleeve 164.

The welded spacer plates 156 and 158 are satisfactory for most installations. However, if rust forms between the spacers and the torque beam 45, together with rust formed on the torque beam 45 beyond the spacers 156 and 158, separation of the torque beam 45 from the axle seat assembly 48 can be difficult. As will be described, other embodiments of this invention confront this problem.

FIGS. 6 through 10 illustrate a second embodiment of the invention wherein a suspension system 170 is installed on a different vehicle that has a chassis 172 and an axle 174 that may be further below the chassis 172 than is the axle 44 relative to the chassis 42. For the suspension system 170, the same hanger assembly 47 may be used.

The same torque beam 45 is incorporated and the same bushing assembly 46 is used to install the torque beam 45 on the hanger assembly 47. However, the axle seat assembly 176 is different, being adapted to the particular vehicle as well as to the fact that the air spring 178 is different, being a triple convolute air spring mounted between the chassis 172 and the axle seat assembly 176 at a location that is partially over the axle 174.

The axle seat assembly 176 comprises an inverted channel member 180 having a top wall 182 and side walls 184 and 186 terminating in outwardly extending flanges 188 and 190. The sides 184 and 186 of the channel member 180 have cutout sections 192 that fit around the upper side of the axle where the sides 184 and 186, together with reinforcing strips 194, are welded to the axle 174. Rearwardly of the axle 174, the channel member 180 is cut to form downwardly and rearwardly inclined upper edges 196 to which a spring seat connecting plate 198 is welded. The air spring 178 is connected between the plate 198 and the chassis 172 by suitable bolts 200 and 202, respectively. There are suitable reinforcing gussets, for example the gussets 204, welded between the sides 184 and 186 and the plate 198 to reinforce the structure.

The connection between the torque beam 45 and the axle seat assembly 176 includes a spacer plate 206 that is welded to the side 184 of the channel member 180, but not to the side wall 56 of the tubular member 50. On the opposite side, there is a spacer plate 208 that is not welded to either the side wall 186 or the side 58. The spacer plate 208 has a front end 210 formed as an outwardly projecting lug by which it can be struck by a hammer to drive the spacer plate 208 clear of the space between the side wall 186 and the side 58 even though the spacer plate 208 may have become rusted in place. Knocking the spacer plate 208 clear makes it easier to separate other areas that may have rusted together.

There are two spacer sleeves 212 and 214 that are welded between the sides 56 and 58 of the tubular member 50. Two bolts 216 and 218 extend through the side wall 184, the spacer plate 206, the tubular sleeves 212 and 214, respectively, the side 58, the spacer plate 208, and the side wall 186, and they are tightened in place by nuts 220 and 222, respectively. After tightening, the bolts 216 and 218 and/or the nuts 220 and 222 may be spot welded in place.

A pair of retainer straps 224 and 226 span the lower side of the axle seat assembly 176 and are fastened to the flanges 188 and 190 by bolts 228. Straps 224 and 226 strengthen the connection between the torque beam 45 and the axle seat assembly 176 and yet, upon removal of the bolts 216 and 218 and removal of the straps 224 and 226, facilitate knocking the torque beam 45 free of the axle seat assembly 176 even when rusted.

This is in contrast to the suspension system 40 of FIG. 1 where the separation of the torque beam 45 from the axle seat assembly 48 must be by sliding those parts free of one another against the resistance of rusted joints.

FIGS. 11 through 13 illustrate another embodiment of the invention wherein a suspension system 240 is installed on a vehicle having a chassis 242 and an axle 244. The suspension system 240 includes the torque beam 45, the bushing assembly 46, and the hanger 47. It also includes an axle seat assembly 246 that is similar to the axle seat assembly 176 of the suspension system 170 except that it accommodates a smaller span between the axle 244 and the chassis 242 and accommodates an air spring 248 that is further forward and more directly above the axle 244.

The axle seat assembly 246 is formed with a rectangular sleeve 250 (similar to the sleeve 130 of FIG. 5) having cutout sections 252 where it is welded to the axle 244 and having cut wall sections 254 to which a downwardly and rearwardly inclined spring seat plate 256 is welded. The air spring 248 is mounted between the chassis 242 and the plate 256. The tubular member 50 is telescoped within and connected to the sleeve 250 by bolts 258 and 260 and spacer plates, like the spacer plate 262. This installation is similar to that illustrated in FIG. 5.

In FIGS. 16 through 21, a suspension system 270 is shown installed on a vehicle having a chassis 272 and an axle 274. The space between the chassis 272 and axle 274 is relatively great, calling for a longer hanger assembly 276 bolted to the chassis 272. As with the hanger assembly 47, the hanger assembly 276 has side walls 278 and 280 that are properly spaced to support a bushing assembly 46 which may be the same bushing assembly as is illustrated in FIGS. 14 and 15.

The axle seat assembly 281 is overslung. It is formed with an inverted U-channel 282 that has a top wall 284 and side walls 286 and 288. The side walls 286 and 288 terminate in outwardly extending flanges 290 and 292. When the beam member 50 is telescopingly received within the channel member 282, metal straps 294 and 296 can be fastened in place by bolts 298 to press the straps 294 and 296 against the bottom wall 54 of the tubular member 50.

The overslung axle seat assembly 281 includes cutout sections 300 in the side walls 286 and 288 where the axle seat assembly 281 is welded to the axle 274. Reinforcing straps 302 may be welded to the side walls 286 and 288 and to the axle. Rearwardly, the axle seat assembly 281 has a spring seat plate 304 that is downwardly and rearwardly inclined. An air spring 306 is connected by bolts to the spring seat plate 304 and to the chassis 274.

The connection between the torque beam 45 and the axle seat assembly 281 include two bolts 310 and 312 connected by nuts 314, spacer sleeves 316, and spacer plates 318 and 320. The spacer plate 320 may be welded to the side wall 288 of the channel member 282, but the spacer plate 318 is not welded so that, upon removal of the bolts 310 and 312, the spacer plate 318 can be knocked free to assist in the separation of the torque beam 45 from the axle seat assembly 281 even though the parts become rusted together. Similarly, the fact that the channel member 282 is open and that the straps 294 and 296 are removable, facilitates separation of the components.

The hanger assembly 276 incorporates a shock absorber bracket 322, and the axle seat assembly 281 incorporates a shock absorber bracket 324. A shock absorber 326 is connected between the brackets 322 and 324.

FIG. 21 illustrates a modification of the axle seat assembly 281. This modified axle seat assembly 281a is cut so it can be welded to a square axle 274a. In all other respects, the axle seat assembly 281a is identical to the axle seat assembly 281, and all the other components of the suspension system are unaffected.

Figure 22:
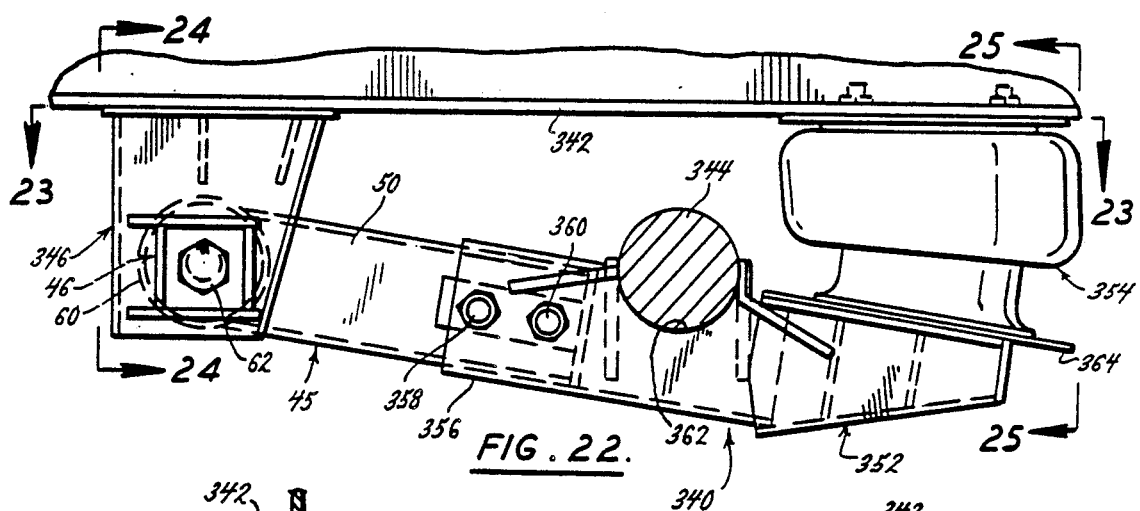
FIG. 22 is a side elevation view of a fifth embodiment of the suspension system of this invention.
Figure 24:
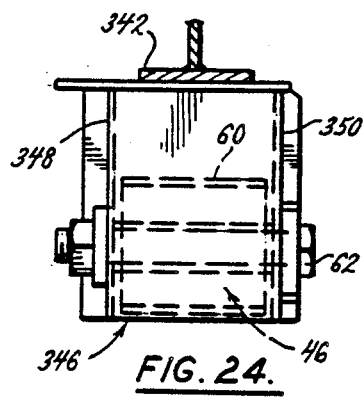
FIG. 24 is a front elevation view of the suspension system of FIG. 22 as viewed along the plane of the line 24—24 of FIG. 22.
Figure 25:
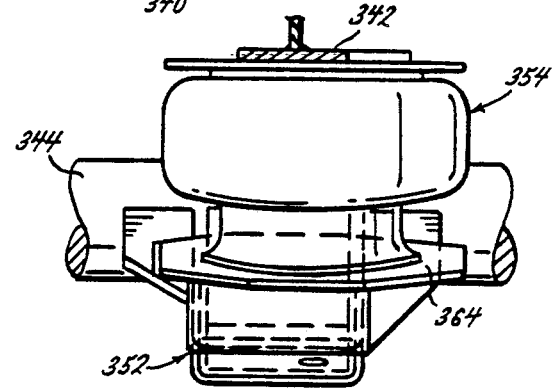
FIG. 25 is a rear elevation view of the suspension system of FIG. 22 as viewed along the plane of the line 25—25 of FIG. 22.

Another suspension system embodiment 340 is shown in FIGS. 22 through 25. The vehicle on which the suspension system 340 is installed includes a chassis 342 and an axle 344 that is relatively close to the chassis 342. Consequently, the hanger 346 is relatively short, but nevertheless includes side walls 348 and 350 between which the bushing assembly 46 is mounted.

The suspension system 340 incorporates the same torque beam 45 (and the same bushing assembly 46) as do the other embodiments, but an axle seat assembly 352 is designed to accommodate a smaller air spring 354 and to accommodate the other parameters that are peculiar to the particular vehicle on which the system 340 is installed. More particularly, the axle seat assembly 352 has a sleeve 356 that receives the tubular member 50 with bolts 358 and 360 for connecting the components together. The sleeve 356 and the connections of the components may be as shown in FIGS. 5, 10 or 20. The axle seat assembly 340 is underslung relative to the axle 344 and therefore has cutout sections 362 where it is welded to the under side of the axle 344. Rearward of the axle 344 and generally aligned with the top of the sleeve 356, the axle seat assembly 340 supports a plate 364. The air spring 354 is mounted between the plate 364 and the chassis 342.

A sixth embodiment of the invention is illustrated in FIGS. 26 through 28 wherein a suspension system 370 is shown installed on a vehicle that has a chassis 372 and an axle 374. On this vehicle, the axle 374 is relatively close to the chassis 372, as with the vehicle illustrated in FIG. 22, but it is closer to the hanger assembly. In the suspension system 370, the hanger assembly 346 can be used to support a bushing like the bushing 46, and the torque beam 45 as already described. However, the air spring 376 is larger than the air spring 354 of the suspension system 340, whereas the ground clearance requirements are reduced.

To accommodate these particular parameters of the vehicle of FIG. 26, the suspension system 370 incorporates an axle seat assembly 378 that has a tubular section 380 with a tower section 382 welded to and extending above the sleeve section 380. The tower section 382 has cutout sections 384 where it is welded to the axle 374. This construction allows the bushing assembly 46 and the axle 374 to be at substantially the same elevation while inclining the sleeve 38 downwardly to a point at which it is connected to an axle seat section 384 that extends rearwardly and supports a spring seat plate 386 in a slightly downwardly inclined orientation. The air spring 376 is connected to the plate 386 and to a bracket 388 that is fastened to the chassis 372.

A shock absorber bracket 390 is supported by and projects upwardly from the hanger assembly 346. Another shock absorber bracket 392 is formed in the fabrication of the axle seat assembly 378. A shock absorber 394 is connected between the brackets 390 and 392.

Installation and Operation

It will now be understood that all of the embodiments represented by the suspension systems 40, 170, 240, 270, 340 and 370 can use the identical torque beam 45 and the identical bushing assembly 46. Some of the suspension systems (40, 170 and 270) can use the same hanger assembly 47. Other suspension systems (340 and 370) can use another hanger assembly 346. Each of the suspension systems has a different axle seat assembly and there are various forms of overslung and underslung connections to the axle.

In operation, all of the connections of the torque beam 45 to the axle seat assemblies are such that the connections are rigid, making the torque beam integral with the axle seat assembly. This produces a monopivot about the bushing assembly 46 as the axle moves up and down.

The recesses 90, 92, 94 and 96 located in the upper and lower quadrants of the bushing increase the compressibility of the bushing under changing vertical loads without significantly influencing the resistance of the bushing to longitudinal loads. These recesses, together with the annular groove 88 and the beveled ends 84 and 86 also improve flow of the bushing member under complex compression loading.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A suspension system for a vehicle having a chassis and an axle comprising a torque beam having forward and rearward ends, means for supporting the forward end of the torque beam from the chassis including a bushing on a transverse axis, an axle seat assembly, means for connecting the axle seat assembly to the axle, a spring connected between the axle seat assembly and the chassis, a telescoping component on the torque beam, a telescoping component on the axle seat assembly, the telescoping components being cooperable to provide a telescoping fitting of one within the other, and means for locking the components in telescoping relationship, means comprising a spacer strip between the components for separating rusted joints between the components and the locking means, the spacer strip being independently removable.

2. A suspension system for a vehicle having a chassis and an axle comprising a torque beam having forward and rearward ends, means for supporting the forward end of the torque beam from the chassis including a bushing on a transverse axle, an axle seat assembly, means for connecting the axle seat assembly to the axle, a spring connected between the axle seat assembly and the chassis, a telescoping component on the torque beam terminating short of the axle, a telescoping component on the axle seat assembly terminating short of the bushing, the telescoping components being cooperable to provide a telescoping fitting of one within the other, and means comprising releasable connections directly to both telescoping components for locking the components in telescoping relationship, the bushing comprising an elastomeric member having an annular wall with generally cylindrical inner and outer faces between inner and outer cylindrical surfaces on the torque beam and the chassis and having spaced end walls, and a plurality of generally horizontal recesses in the annular wall to enhance flow of the member when compressed, the recesses being generally concentrated in two diametrically opposite quadrants of the member, and arcuate grooves in the member interconnecting the recesses in each quadrant.

3. The suspension system of 2 wherein there are three recesses in each quadrant.

4. A suspension system for a vehicle having a chassis and an axle comprising a torque beam having forward and rearward ends, means for supporting the forward end of the torque beam from the chassis including a bushing on a transverse axis, an axle seat assembly, means for connecting the axle seat assembly in overslung relation to the axle, a spring connected between the axle seat assembly and the chassis, a telescoping component on the torque beam terminating short of the axle, a telescoping component on the axle seat assembly terminating short of the bushing, the telescoping components being cooperable to provide a telescoping fitting of one within the other, and means comprising releasable connections directly to both telescoping components for locking the components in telescoping relationship, the axle seat assembly comprising a U-channel having spaced side walls terminating in outwardly extending lateral flanges, a spring seat plate welded to a portion of the flanges leaving an uncovered portion of the side walls in an area overlying the axle, one of said components comprising a rectangular sleeve receivable between and in contact with the side walls of the channel at said uncovered portion and being welded thereto.

5. A suspension system for vehicles each of which has a chassis and an axle comprising a plurality of axle seats of different configurations to accommodate different vehicle requirements of the respective vehicles, each axle seat of its respective vehicle being connected to an axle and being connectable to an air spring mounted between the axle seat and the chassis, each axle seat having a hollow sleeve adapted to receive a complementary end of a torque beam for telescoping connection thereto, all of the hollow sleeves being of substantially the same cross section even though their lengths may differ to accommodate the different vehicle requirements, a torque beam of predetermined length having an end complementary in shape to and smaller in cross section than that of the hollow sleeves to enable said complementary end to fit within the hollow sleeve of any selected one of the axle seats, the complementary shapes and cross sections of the torque beam and hollow sleeves providing bearing contact between the top and bottom walls of the toque beam and the top and bottom walls of a sleeve to provide a rigid connection between the torque beam and a hollow sleeve, the torque beam having an end opposite said complementary end, means for pivotally supporting said opposite end from the chassis, and bolts extending through both the torque beam and a hollow sleeve for positively and releasably locking them together to enable the torque beam to be is connected from an axle seat of one configuration and to be connected to an axle seat of a configuration different from said one configuration.

6. The suspension system of claim 5 including a hanger depending from the chassis and wherein said opposite end of the torque beam comprises a sleeve, and a bushing assembly including the sleeve for mounting the torque beam to the hanger and including an annular elastomeric member within the sleeve having recesses to facilitate flow of the elastomeric member when compressed.

7. The suspension system of claim 5 wherein the sleeves are rectangular in cross section and said complementary end of the torque beam is rectangular in cross section.

8. The suspension system of claim 7 wherein said complementary end is substantially square in cross section.

9. The suspension system of claim 5 wherein one of the axle seats is underslung and one of the axle seats is overslung relative to the axle.

10. The suspension system of claim 9 wherein the underslung axle seat includes a tower section connected to and projecting above the sleeve, the tower section being connected to the axle.

11. The bushing assembly of claim 5 wherein the complementary end of the torque beam is substantially square and hollow with outside dimensions of at least about five inches by five inches, and with a maximum wall thickness of about one-fourth inch.

12. A suspension system for vehicles each of which has a chassis and an axle comprising a plurality of axle seats of different configurations to accommodate different vehicle requirements of the respective vehicles, each axle seat of its respective vehicle being connected to an axle and being connectable to an air spring mounted between the axle seat and the chassis, each axle seat having a hollow sleeve adapted to receive a complementary end of a torque beam for telescoping connection thereto, all of the hollow sleeves being of substantially the same rectangular cross section even though their lengths may differ to accommodate the different vehicle requirements, a torque beam of predetermined length having a rectangular end complementary in shape to and smaller in cross section than the hollow sleeves to enable said complementary end to fit within the hollow sleeve of any selected one of the axle seats, the torque beam having an end opposite said complementary end, means for pivotally supporting said opposite end from the chassis, bolts extending through both the torque beam and a hollow sleeve for positively and releasably locking them together, the lower side of a sleeve being defined by removable plate means.

13. The suspension system of claim 12 including spacer plates between and in contact with the torque beam and a sleeve, at least one spacer plate being welded to one of the torque beam and sleeve and at least one spacer being free from welding to the torque beam and sleeve, the latter spacer plate including a lug accessible to impact from a hammer to free said latter spacer plate from rust connections to the torque beam and sleeve.

14. A bushing assembly for a suspension system for a vehicle having a chassis and an axle comprising an inner sleeve, an outer sleeve, and an annular elastomeric member, the elastomeric member having an inner cylindrical face in contact with the inner sleeve and an outer cylindrical face in contact with the outer sleeve and having first and second ends between the inner and outer faces, a plurality of recesses in each end of the elastomeric member and extending inward from the respective ends, an annular groove in the first end interconnecting the recesses therein, and an annular groove in the second end interconnecting the recesses therein.

15. The bushing assembly of claim 14 wherein the outer sleeve is supported by a torque beam and axle seat assembly, the torque beam and axle seat assembly being connected to the axle, and spring means connected between the torque beam and axle seat assembly and the chassis.

16. The bushing assembly of claim 14 wherein the ends of the elastomeric member have annular beveling.

17. The bushing assembly of claim 14 including an annular groove in the outer face intermediate the ends of the elastomeric member and unimpeded by the outer sleeve whereby upon compression of the elastomeric member the annular groove is reduced in size.

18. The suspension system of claim 17 wherein the uncompressed outside diameter of the elastomeric member is at least about five inches and the span between the ends is about five inches.

* * * * *